United States Patent
Daneau et al.

(10) Patent No.: US 7,409,247 B2
(45) Date of Patent: Aug. 5, 2008

(54) METHOD AND SYSTEM FOR ESTIMATING A QUANTITY OF PARTICLES EMITTED IN THE EXHAUST GAS OF A DIESEL ENGINE FOR A MOTOR VEHICLE

(75) Inventors: Marc Daneau, Boulogne Billancourt (FR); Caroline Netter, Paris (FR)

(73) Assignee: Renault s.a.s., Boulogne Billancourt (FR)

( * ) Notice: Subject to any disclaimer, the term of this patent is extended or adjusted under 35 U.S.C. 154(b) by 0 days.

(21) Appl. No.: 10/580,004

(22) PCT Filed: Nov. 9, 2004

(86) PCT No.: PCT/FR2004/050574

§ 371 (c)(1),
(2), (4) Date: Dec. 20, 2006

(87) PCT Pub. No.: WO2005/052332

PCT Pub. Date: Jun. 9, 2005

(65) Prior Publication Data
US 2007/0174222 A1    Jul. 26, 2007

(30) Foreign Application Priority Data
Nov. 19, 2003    (FR) .................................. 03 13549

(51) Int. Cl.
*G01M 17/00* (2006.01)
*G06F 7/00* (2006.01)
*G06F 15/18* (2006.01)
*F01N 3/00* (2006.01)
*G05B 13/02* (2006.01)
*G06E 1/00* (2006.01)
*G06E 3/00* (2006.01)
*G06G 7/00* (2006.01)

(52) U.S. Cl. .......................... 700/48; 701/29; 701/59; 60/273; 60/274; 60/276; 706/19; 706/23

(58) Field of Classification Search ............. 700/48; 706/15, 26, 19, 23; 702/1, 85, 105, 113; 701/29, 59, 108–109; 60/273–274, 276
See application file for complete search history.

(56) References Cited

U.S. PATENT DOCUMENTS

| 5,625,750 A | 4/1997 | Puskorius et al. |
| 7,165,399 B2 * | 1/2007 | Stewart .................. 60/600 |
| 7,281,518 B1 * | 10/2007 | Allain et al. ............. 123/434 |
| 2004/0031262 A1 * | 2/2004 | Gui et al. ................ 60/285 |
| 2007/0251218 A1 * | 11/2007 | Driscoll et al. ............ 60/286 |

FOREIGN PATENT DOCUMENTS

| DE | 197 41 973 | 4/1999 |
| EP | 0 877 309 | 11/1998 |
| FR | 2 804 173 | 7/2001 |

OTHER PUBLICATIONS

An Integrated Approach for the Design of Diesel Engine Exhaust Systems to meet Euro 4 and beyond Emissions Legislations; by C. Wassermay et al.; Thiesel 2002 Conference on Thermo- and Fluid-Dynamic Processes in Diesel Engines; 15 pages.*

(Continued)

*Primary Examiner*—Ronald D Hartman, Jr.
(74) *Attorney, Agent, or Firm*—Oblon, Spivak, McClelland, Maier & Neustadt, P.C.

(57) ABSTRACT

The inventive system for estimating quantities of pollution compounds emitted in the exhaust gas of a diesel engine for a motor vehicle comprises means for regenerating a solid particle filter and an electronic control unit which manages the engine operation and is provided with one or several data memories. Said system also comprises one or several neurone networks (1) and networks (2) of input data representative for the engine operation and possibly for the vehicle motion, said data is available in the electronic control unit for managing the engine operation without an additional sensor. Said system also comprises means (4) for cumulating estimated quantities.

13 Claims, 4 Drawing Sheets

OTHER PUBLICATIONS

Google Search Results; 2 pages.*
Diesel Particulate Matter; Wikipedia; 2 pages.*
Diesel Particulate Filter; Wikipedia; 6 pages.*
Gamo, Ouenou S. et al., "Diesel Engine Exhaust Emissions Modelling Using Artificial Neural Networks", Sae Technical Paper Series, No. 1999-01-1163, pp. 1-8, 1999.
Brace, Chris, "Prediction of Diesel Engine Exhaust Emissions Using Artificial Neural Networks", Neural Networks in Systems Design, pp. 1-11, 1998.

* cited by examiner

METHOD AND SYSTEM FOR ESTIMATING A QUANTITY OF PARTICLES EMITTED IN THE EXHAUST GAS OF A DIESEL ENGINE FOR A MOTOR VEHICLE

BACKGROUND OF THE INVENTION

1. Field of the Invention

The present invention relates to a method and a system for estimating quantities of particulates emitted in the exhaust gases of a diesel engine of a motor vehicle.

The estimation of the quantities of particulates emitted in the exhaust gases of a diesel engine of a motor vehicle is useful for managing engine control and for regenerating the pollution control means (particulate filters), as accurately and economically as possible.

2. Description of the Related Art

Present computer models consume a considerable amount of computer time, and are inaccurate. It is often unfeasible to mount these models in a vehicle because of their computational complexity and the memory size necessary. Their drastic simplification severely jeopardizes estimation performance.

Mapping estimation models exist. The number of parameters affecting these estimations is relatively large. Two-dimensional mapping management demands the arrangement of several mappings, including correction mappings, making the estimation complex. Moreover, the addition of mappings behind one another does not allow a description of the operating space in the same way as a model with more than two inputs. Such models are also difficult to calibrate. Furthermore, the mapping models fail to account for dynamic phenomena which are very important for these estimations.

Models used on computers also exist, but not on an onboard computer, because the little memory available on an onboard computer implies computation times incompatible with real time. These models fail to account for the limited power of the computers. They sometimes use input measurements that are unknown on a vehicle, and it is unfeasible to add just any sensor, assuming that this is technically possible, on a vehicle. These models may also be recursive, and incur risks of divergent estimations.

The document "Virtual Sensors: A real-time neural network-based intelligent performance and emissions prediction system for on-board diagnostics and engine control" by Chris Atkinson and Mike Traver, describes a method for predicting releases in exhaust gases. This method calculates the rate of instantaneous releases which are too inaccurate to use their cumulative value to trigger action.

The document "Prediction of emissions from a turbocharged passenger car diesel engine using a neural network" by C. J. Brace, M. Deacon, N. D. Vaughan, J. Charlton, and C R Burrows, describes an estimation by mapping that is too inaccurate and fails to account for dynamic phenomena, as explained above.

The document "Prediction of Diesel Engine Exhaust Emissions using Artificial Neural Networks", by Chris Brace, describes a system that is difficult to mount on a vehicle, uses inputs unavailable on a vehicle, and it is unfeasible to add just any sensor, presuming that it is technically possible.

SUMMARY OF THE INVENTION

In consideration of the above, it is an object of the invention to propose a solution for estimating emissions of particulates (soot and other pollutants) reliably and accurately using a device without extra cost, when mounted on a motor vehicle.

It is a further object of the invention to aid the strategy for calibrating engine control strategies.

The system according to the invention is suitable for estimating the quantities of pollutant compounds emitted in the exhaust gases of a diesel engine of a motor vehicle, comprising means for regenerating a solid particulate filter, an electronic control unit for managing the engine operation comprising data memories. The system further comprises one or more neural networks, and input data representative of the engine operation and, optionally, of the vehicle movement, said data being available in the electronic control unit for managing the engine operation without adding a sensor.

In a preferred embodiment, the system comprises 10 to 15 neurons.

In an advantageous embodiment, the system comprises training databases of the neural network or networks, said databases being vehicle drive sequences of at least a few minutes.

In a first embodiment, the data used at the input of the neural network or networks comprise at least one of the following parameters:

the engine speed at two consecutive times t and $t-\Delta t$;
the fuel flow rate at three consecutive times t, $t-\Delta t$ and $t-2\Delta t$;
the engine coolant temperature; and
the vehicle speed at time t;

where $\Delta t$ is the preset time interval between two consecutive measurement times. The system estimates at least the cumulative quantity of the soot in the exhaust gases which will be retained by the particulate filter.

In another embodiment, the data used at the input of the neural network or networks comprise at least one of the following parameters:

the engine speed at two consecutive times t and $t-\Delta t$;
the fuel flow rate at three consecutive times t, $t-\Delta t$ and $t-2\Delta t$;
the engine coolant temperature; and
the fuel-air ratio of the mixture at time t;

where $\Delta t$ is the preset time interval between two consecutive measurement times. The system estimates at least the cumulative quantity of the soot which will be retained by the particulate filter.

In another embodiment adapted to an engine with common rail injection, the data used at the input of the neural network or networks at time t comprise at least one of the following parameters:

the fuel preinjection rate in the engine;
the main fuel injection rate in the engine;
the relative displacement of a piston with respect to top dead center from the time when the last fuel injection in the piston cylinder started;
the relative displacement of a piston with respect to top dead center from the time when the last main fuel injection in the piston cylinder started;
the engine coolant temperature;
the engine air feed rate;
the pressure inside the common rail; and
the engine speed;

and the estimated quantities of particles comprise at least one of the following quantities:

the cumulative quantity of the soot in the exhaust gases that will be retained by a particulate filter;
the cumulative quantity of nitrogen oxides in the exhaust gases;
the cumulative quantity of carbon oxides in the exhaust gases; and the cumulative quantity of hydrocarbons in the exhaust gases.

In one advantageous embodiment, no output from the system is looped to an input of the system to avoid any problem of stability.

In a preferred embodiment, the system comprises means for resetting the estimated quantities of particulates, independently of each other.

The method for evaluating a system according to the invention comprises a phase in which it evaluates the best configuration of the neural network or networks by calculating the error on the output quantities by cumulation on a sliding window.

In a preferred embodiment, the sliding window is determined so that its size is minimal while allowing an estimation error lower than a preset value.

In an advantageous embodiment, the size of the window varies between 0.5 km and 1.5 km to allow an estimation error of not more than 5 g of solid particulates emitted per 135 km traveled by the vehicle.

In a preferred embodiment, part of the data reserved for training the neural network or networks is discarded to perform a validation without the data used.

Furthermore, the system according to the invention relates to an application to control the means for regenerating the solid particulate filter using a comparison between the estimated quantity of cumulative soot and a memorized threshold value.

The system according to the invention also relates to an application to aid the calibration of engine control strategies from the estimation of the engine emissions over a drive cycle.

BRIEF DESRIPTION OF THE DRAWINGS

Other goals, features and advantages of the invention will appear from reading the following description, provided exclusively as a nonlimiting example, with reference to the drawings appended hereto, in which.

DESCRIPTION OF THE PREFERRED EMBODIMENTS

The training cycles for the neural network or networks are drive cycles lasting a few minutes, for example, the MNVEG cycle or the FTP cycle, the MNVEG cycle being better with the cumulation criterion.

Conventional criteria for calculating an error on the neural networks fail to account for the problem of taking account of the instantaneous quantity and the cumulative quantity. In fact, pessimistic criteria such as maximum errors take account of the worst instantaneous case considering that it is true throughout time, and they consider that in this worst case, the cumulation would be multiplied by the driving time. However, these cases are highly improbable, and particularly it should be noted that these extreme instantaneous errors are often due to transition or dynamic effects (sudden acceleration, sudden braking, etc.) which cannot be repeated over a long period.

Furthermore, criteria such as the mean absolute error or the mean rms error, fail to consider that the predicted rate fluctuates about the real rate. In this case, the mean absolute error and the mean rms error will be high, while the cumulation value will be correct.

Finally, considering the error on the cumulation over a whole cycle implies that this sequence, that is the cycle, is significant for this calculation, hence indivisible. In fact, a zero mean error can be obtained on the whole sequence by underestimating the cumulation over one part of the cycle and by overestimating it on another. Yet while these parts can be repeated independently, the cumulative error will be high. For example, if the cycle contains city driving, at low speed, where the model overestimates the emissions, and freeway driving, for which the model underestimates the emissions, a wide difference is accordingly accumulated between the prediction and reality by traveling exclusively in conditions specific to one of the parts. If only city driving applies, the emissions are always overestimated, and never compensated for by a freeway underestimation. On the contrary, if these two parts were acceleration and deceleration, this problem would not arise because the number would not vary despite the driving conditions. The cumulation criterion on a sliding window is an intermediate criterion between these two extremes. It consists in using the maximum absolute error of the cumulative quantity over a certain distance, for example 1 km.

Figure 1:
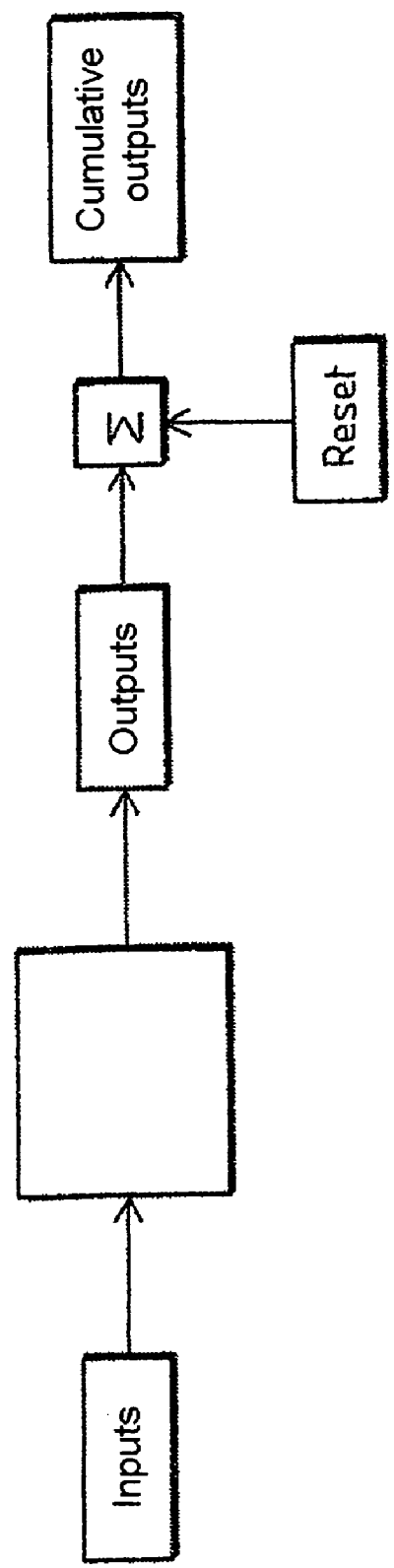
FIG. 1 is a block diagram illustrating the structure of a system according to the invention.

FIG. 1 shows the general architecture of a system for estimating quantities of pollutant compounds emitted in the exhaust gases of a diesel engine, according to the invention. The system comprises one or more neural networks 1 receiving input data 2, and supplying the estimated quantities 3 at the output. The system further comprises means 4 for cumulating the estimated quantities to give cumulative quantities 5. The system also comprises means 6 for resetting the estimated quantities of pollutant compounds, independently of each other. These means 6 are also called reset 6.

The neural network or networks 1 are arranged, as done conventionally, in the form of layers each constituting a processing module. These modules are interconnected by links extending between the neurons of each layer in a specific configuration. Thus, by analyzing the output value of the neurons, that is, their activity, it is possible to determine the degree of correspondence between a signature corresponding to an activity to be analyzed and a signature of a known activity. Neural networks 1 are architectures well known to a person skilled in the art. Hence they are not described in detail below.

Figure 2:
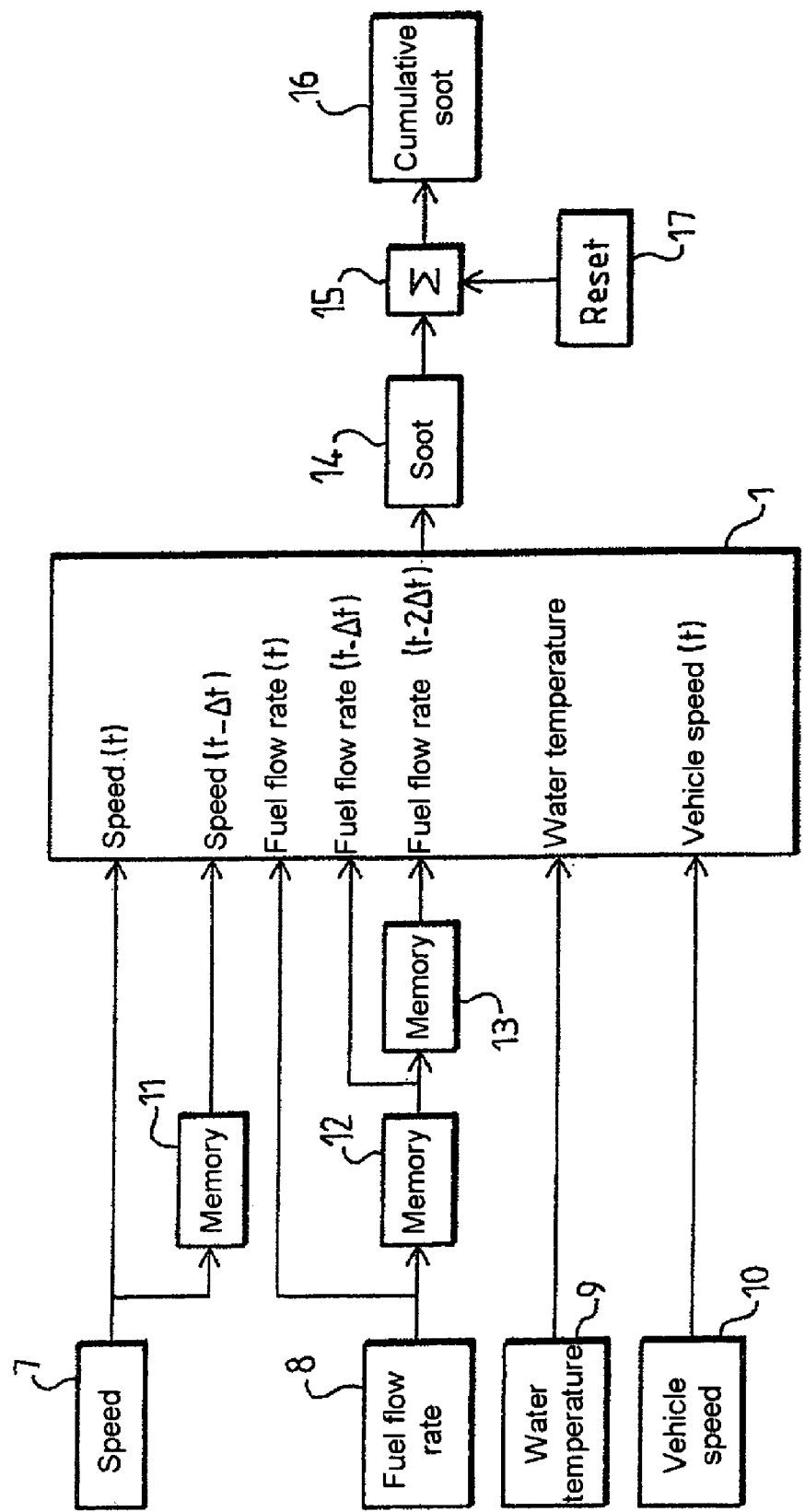
FIG. 2 is a block diagram of a first embodiment of the system according to the invention.

In FIG. 2 the reference numerals for elements similar to those of FIG. 1 have been preserved. FIG. 2 shows a system according to the invention, comprising one or more neural networks 1 receiving at input data representative of engine operation and, optionally, vehicle movement. The data comprise at least the engine speed 7, the fuel flow rate 8, the temperature 9 of the engine coolant, and the vehicle speed 10. The system further comprises memories 11, 12 and 13 to store data, and supplies at least the cumulative amount 16 of the soot at the output. The system also comprises means 15 for cumulating the estimated quantities 14 of soot to supply the cumulative quantity 16 of soot, and also comprises means 17 for resetting the estimated cumulative quantity 16 of soot, also called reset.

The electronic control unit managing the engine operation provides the system with input data, that is, the engine speed 7, the fuel flow rate 8, the engine coolant temperature 9, and the vehicle speed 10. The time interval between two times for determining the input data is a preset interval $\Delta t$. The memory 11 stores the preceding value of the engine speed 7, and can then, at time t, supply the system with the values of the engine speed 7 at times t and t-Δt. The memories 12 and 13 will store the two preceding values of the fuel flow rate 8, enabling it to supply the system, at time t, with the values of the fuel flow rate 8 at times t, t-Δt and t-2Δt. The means 15 for cumulating the estimated quantities 14 of soot serve for estimating the cumulative quantity 16 of soot emitted, and this cumulative quantity 16 can be reset by the reset 17 when the particulate filter has been regenerated. The input data of the system are available in the conventional electronic control units without having to add a new sensor.

The training cycle used is the MNVEG European drive cycle. A maximum limit is set for the error to select the minimum size of the sliding window. The quantity about which a solid particulate filter must be regenerated is 20 g, with a target confidence interval of 25% making an error lower than 5 g. Since the engine produces 20 g of soot particulates every 135 km, a mean error of 5 g per 135 km, or 37 mg per km, is allowable. Having set this limit, an analysis of the effect of the length of the sliding window on the cumulation error yields the result that the cumulation error decreases with increasing size of the sliding window. To obtain a cumulative error lower than the imposed limit (5 g per 135 km), a sliding window of 1.5 km should be used.

The optimal number of neurons is determined in particular according to the fact that the system is mounted onboard the vehicle and imposes restrictions on the total number of parameters. After generation of the models, it appears that 10 to 15 neurons suffice to represent the complexity of the underlying function. The number of data instants influencing the cumulation calculation is also determined empirically.

Figure 3:
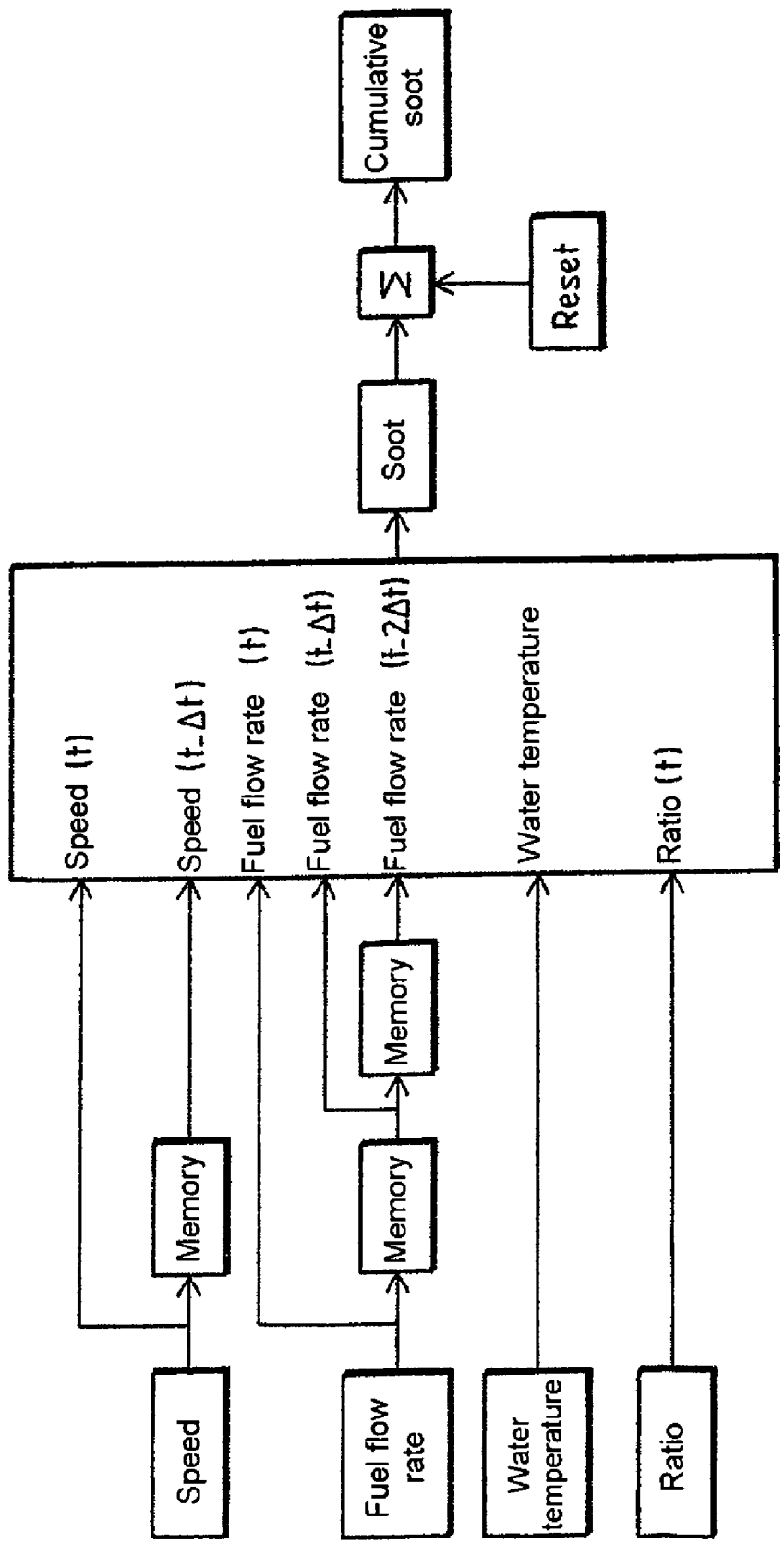
FIG. 3 is a block diagram of a second embodiment of the system according to the invention.

In FIG. 3 the reference numerals for elements similar to those of FIGS. 1 and 2 have been preserved. FIG. 3 shows a system according to the invention, comprising one or more neural networks 1 receiving, as input, data representative of engine operation, said data comprising at least the engine speed 7, the fuel flow rate 8, the engine coolant temperature 9, and the fuel-air ratio 18 of the mixture (ratio representing the proportion of fuel in the fuel/air mixture fed to the engine). The system further comprises memories 11, 12 and 13 to store data, and supplies at least the cumulative amount 16 of the soot at the output. The system also comprises means 15 for cumulating the estimated quantities 14 of soot to supply the cumulative quantity 16 of soot, and also comprises means 17 for resetting the estimated cumulative quantity 16 of soot, also called reset 17.

The electronic control unit managing the engine operation provides the system with input data, that is, the engine speed 7, the fuel flow rate 8, the engine coolant temperature 9, and the fuel-air ratio 18 of the mixture fed to the engine. The time interval between two times for determining the input data is a preset interval Δt. The memory 11 stores the preceding value of the engine speed 7, and can then, at time t, supply the system with the values of the engine speed 7 at times t and t-Δt. The memories 12 and 13 store the two preceding values of the fuel flow rate 8, enabling it to supply the system, at time t, with the values of the fuel flow rate 8 at times t, t-Δt and t-2Δt. The means 15 for cumulating the estimated quantities 14 of soot serve for estimating the cumulative quantity 16 of soot emitted, and this cumulation can be reset by the reset 17 when the particulate filter has been regenerated. The input data of the system are available in the conventional electronic control units without having to add a new sensor.

The training cycle used is again the MNVEG European drive cycle. A mean error of 5 g per 135 km or 37 mg per km, is still allowable. With this system, the size of the sliding window can be reduced to 0.5 km while satisfying the set cumulative error limit. The figure of 10 to 15 neurons is also satisfactory.

These two systems according to the invention, described in FIGS. 2 and 3, can be implemented for controlling the regenerations of the particulate filter, according to the estimation of the cumulative quantity 16 of soot by one of these systems.

Figure 4:
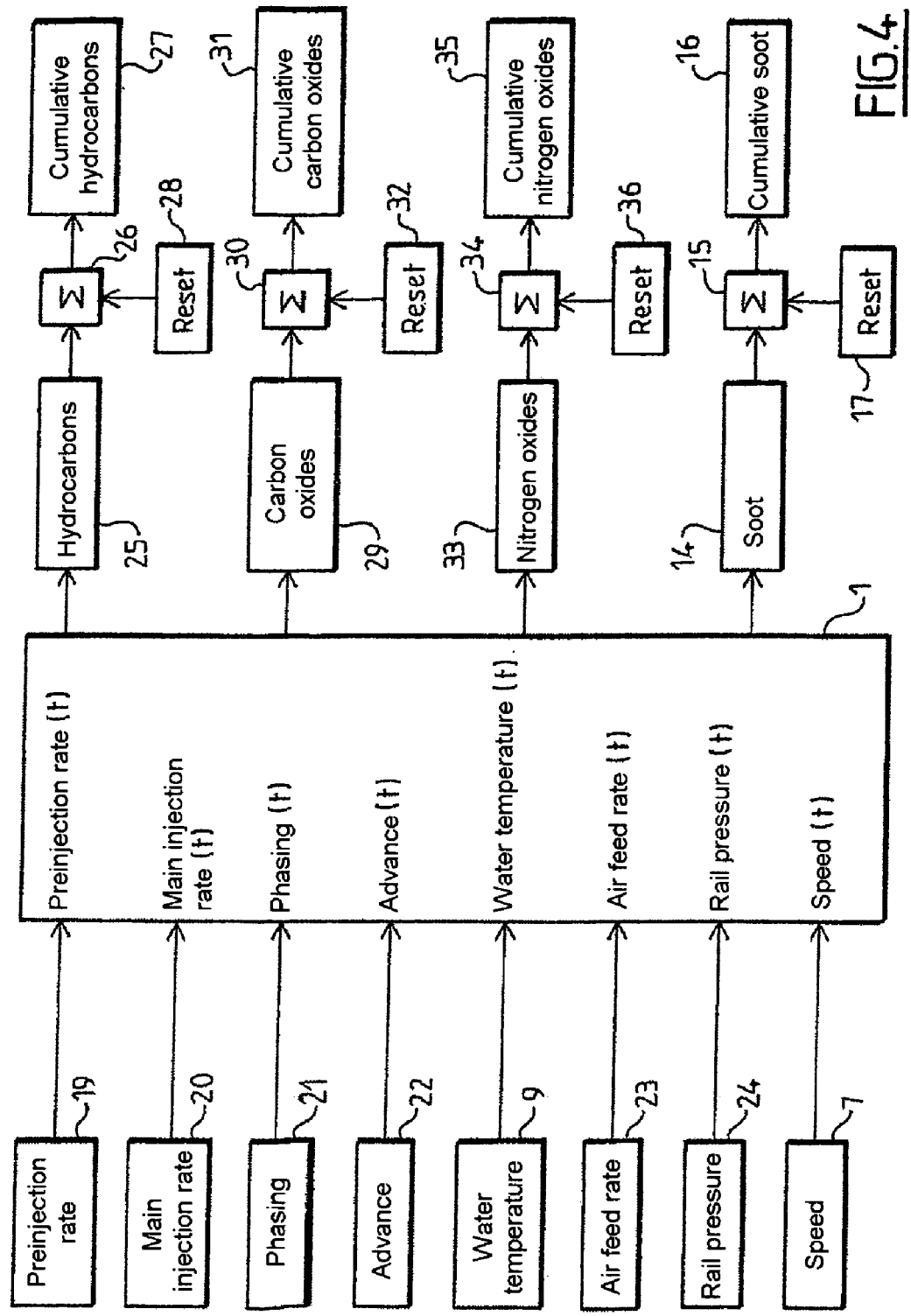
FIG. 4 is a block diagram of a third embodiment of the system according to the invention.

In FIG. 4 the numerals for similar elements to those of FIGS. 1, 2 and 3 have been preserved. FIG. 4 describes a system according to the invention comprising one or more neural networks 1 receiving, as input, data representative of the engine operation, said data comprising at least the preinjection rate 19 (injection rate preceding the main injection), the main injection rate 20, the phasing 21 (relative displacement of a piston with respect to top dead center from the time when the last injection (preinjection or postinjection) of fuel into the piston cylinder has started, generally expressed in crankshaft degrees), the advance 22 (relative displacement of a piston with respect to top dead center from the time when the last main fuel injection into the piston cylinder has started, generally expressed in crankshaft degrees), the engine coolant temperature 9, the engine air feed rate 23, the pressure 24 in the common rail (pressure in the fuel feed line), and the engine speed 7.

All these input data are supplied by the electronic control unit managing the engine operation. The means 26 for cumulating the estimated qualities 25 of hydrocarbons in the exhaust gases serve to estimate the cumulative amount 27 of hydrocarbons emitted in the exhaust gases, and this cumulative amount can be reset by the reset 28. The means 30 for cumulating the estimated quantities 29 of carbon oxides in the exhaust gases serve to estimate the cumulative amount 31 of carbon oxides emitted in the exhaust gases, and this cumulative amount 31 can be reset by the reset 32. Similarly, the means 34 for cumulating the estimated quantities 33 of nitrogen oxides in the exhaust gases serve to estimate the cumulative quantity 35 of nitrogen oxides emitted in the exhaust gases, and this cumulative quantity can be reset by the reset 36. Moreover, the means 15 for cumulating the estimated quantities 14 of soot in the exhaust gases serve to estimate the cumulative quantity 16 of soot emitted in the exhaust gases, and this cumulative quantity can be reset by the reset 17.

The training cycle used is again the MNVEG European drive cycle. A mean error of 5 g per 135 km or 37 mg per km, is still allowable. With this system, the size of the sliding window can be reduced to 0.5 km while satisfying the set cumulative error limit. The figure of 10 to 15 neurons is also satisfactory.

This system according to the invention, described in FIG. 4, can be implemented in order to aid the calibration of the engine control strategies from the estimation of the engine emissions over a drive cycle.

The invention serves to predict the pollutant emissions of a diesel vehicle engine, and particularly solid particulate emissions, in order to manage the means for regenerating the pollution control devices, such as the particulate filter.

The invention also serves to aid the calibration of the engine control strategies.

The input data used by the invention are data already available in the electronic control unit for controlling the engine operation, without having to add any additional device or sensor.

The invention serves to take account of nonlinear phenomena, and contains no looping of the outputs to the inputs, thereby avoiding problems of loop instability.

The invention further serves to use dynamic and static data, and to have a large number of tests in a short time interval compared with many other types of static models.

The invention claimed is:

1. A system for estimating quantities of pollutant compounds emitted in exhaust gases of a diesel engine of a motor vehicle, comprising means for regenerating a solid particulate filter, an electronic control unit for managing a engine operation comprising data memories, and the system further comprising:
   one or more neural networks;
   input data representative of the engine operation and, optionally, of vehicle movement, said data being available in the electronic control unit for managing the engine operation without adding a sensor;
   means for cumulating the estimated quantities; and
   10 to 15 neurons.

2. The system as claimed in claim 1, further comprising training databases of the one or more neural networks, said databases being vehicle drive sequences of at least a few minutes.

3. The system as claimed in claim 1, wherein data used at an input of the one or more neural networks comprise at least one of the following parameters:
   an engine speed at two consecutive times t and t-$\Delta$t;
   a fuel flow rate at three consecutive times t, t-$\Delta$t and t-2$\Delta$t;
   an engine coolant temperature; and
   a vehicle speed at time t;
   where $\Delta$t is the preset time interval between two consecutive measurement times and further comprising means for estimating at least the cumulative quantity of soot in the exhaust gases which will be retained by the particulate filter.

4. The system as claimed in claim 1, wherein data used at an input of the one or more neural networks comprise at least one of the following parameters:
   an engine speed at two consecutive times t and t-$\Delta$t;
   a fuel flow rate at three consecutive times t, t-$\Delta$t and t-2$\Delta$t;
   an engine coolant temperature; and
   a fuel-air ratio of a mixture at time t;
   where $\Delta$t is the preset time interval between two consecutive measurement times and further comprising means for estimating at least the cumulative quantity of soot in the exhaust gases which will be retained by a particulate filter.

5. The system as claimed in claim 1, adapted to an engine with common rail injection, wherein a data used at an input of the one or more neural networks at time t comprise at least one of the following parameters:
   a fuel preinjection rate in the engine;
   a main fuel injection rate in the engine;
   a relative displacement of a piston with respect to top dead center from a time when a last fuel injection in a piston cylinder started;
   the relative displacement of a piston with respect to top dead center from a time when a last main fuel injection in a piston cylinder started;
   an engine coolant temperature;
   an engine air feed rate;
   a pressure inside the common rail; and
   an engine speed;
   and wherein the estimated quantities of pollutant compounds comprise at least one of the following quantities:
   the cumulative quantity of soot in the exhaust gases that will be retained by a particulate filter;
   the cumulative quantity of nitrogen oxides in the exhaust gases;
   the cumulative quantity of carbon oxides in the exhaust gases; and
   the cumulative quantity of hydrocarbons in the exhaust gases.

6. The system as claimed in claim 1, further comprising means for resetting the estimated quantities of particulates, independently of each other.

7. A method of calibrating engine control strategies comprising a step of estimating engine emissions over a vehicle drive cycle, wherein said estimating step is performed with the system as defined in claim 6.

8. A system for estimating quantities of pollutant compounds emitted in exhaust gases of a diesel engine of a motor vehicle, comprising means for regenerating a solid particulate filter, an electronic control unit for managing the engine operation comprising data memories, and further comprising:
   one or more neural networks;
   input data representative of the engine operation and, optionally, of vehicle movement, said data being available in the electronic control unit for managing the engine operation without adding a sensor; and
   means for cumulating the estimated quantities,
   wherein no output from the system is looped to an input of the system to avoid any problem of stability.

9. A method of controlling the means for regenerating the solid particulate filter of either claims 5 and 8, the method comprising the step of comparing an estimated quantity of cumulative soot with a memorized threshold value.

10. A method for evaluating a system for estimating quantities of pollutant compounds emitted in exhaust gases of a diesel engine of a motor vehicle, comprising means for regenerating a solid particulate filter, an electronic control unit for managing the engine operation comprising data memories, and further comprising:
    one or more neural networks;
    input data representative of the engine operation and, optionally, of vehicle movement, said data being available in the electronic control unit for managing the engine operation without adding a sensor; and
    means for cumulating the estimated quantities,
    said method comprising the step of:
    evaluating a best configuration of the one or more neural networks by calculating an error on output quantities by cumulation on a sliding window.

11. The method as claimed in claim 10, comprising the step of determining the sliding window so that its size is minimal while allowing an estimation error lower than a preset value.

12. The method as claimed in claim 11, wherein the size of the window corresponding to a vehicle movement varies between 0.5 km and 1.5 km to allow an estimation error of not more than 5 g of solid particulates emitted per 135 km traveled by the vehicle.

13. The method as claimed in claim 10, comprising the step of discarding part of the input data, reserved for training the one or more neural networks, to perform a validation without the input data being used.

* * * * *